United States Patent [19]

Rattman

[11] 3,771,871

[45] Nov. 13, 1973

[54] APPARATUS FOR FORMING IMAGES ON CONTINUOUSLY MOVING ELEMENTS

[75] Inventor: James A. Rattman, Philips, Wis.

[73] Assignee: E.I. du Pont de Nemours and Company, Wilmington, Del.

[22] Filed: Oct. 4, 1971

[21] Appl. No.: 186,321

[52] U.S. Cl. .................................. 355/102, 355/103

[51] Int. Cl. .......................................... G03b 27/08

[58] Field of Search ...................... 355/102, 49, 111; 95/14

[56] References Cited

UNITED STATES PATENTS

| | | | |
|---|---|---|---|
| 409,507 | 8/1889 | Schmalz | 95/1 |
| 1,738,095 | 12/1929 | Carleton | 355/90 |
| 436,627 | 9/1890 | Enjalbert | 95/14 X |
| 2,081,187 | 5/1937 | Stuart | 355/49 |
| 1,031,820 | 7/1912 | Schneider | 355/111 |

*Primary Examiner*—John M. Horan
*Attorney*—William R. Moser

[57] ABSTRACT

A machine for making resist images having separate means for feeding sheet or plate articles in sequence, for receiving and laminating the articles to a photosensitive layer on a flexible support, for continuously feeding the layer and support, for imagewise exposing the continuously moving laminae to actinic radiation, for delaminating the support from the remaining laminae, and optionally, means for applying heat to the laminae during delamination.

9 Claims, 7 Drawing Figures

INVENTOR
JAMES A. RATTMAN

BY William R. Moser

ATTORNEY

INVENTOR
JAMES A. RATTMAN

BY William R. Moser
ATTORNEY

INVENTOR
JAMES A. RATTMAN

BY William R. Moser
ATTORNEY

PATENTED NOV 13 1973 3,771,871

SHEET 4 OF 4

INVENTOR
JAMES A. RATTMAN

BY William R. Moser

ATTORNEY

APPARATUS FOR FORMING IMAGES ON CONTINUOUSLY MOVING ELEMENTS

BACKGROUND OF THE INVENTION

1. Field of the Invention

This invention relates to image reproduction apparatus and more particularly to image reproduction apparatus using photopolymerizable material as the image reproducing medium.

The apparatus is particularly useful for practicing the processes of Assignee's patents to Celeste, U.S. Pat. No. 3,469,982, and Celeste et al., U.S. Pat. No. 3,607,264.

2. Description of the Prior Art

Assignee's U.S. Pat. to Cohen et. al., No. 3,547,730, discloses an integrated machine for automatically preparing resist images on shaped articles in a continuous or semicontinuous manner.

This invention provides accurate registration of transparencies for image reproduction on articles moving continuously with a web.

SUMMARY OF THE INVENTION

An apparatus for forming an image on the surface of a continuously moving article comprising a. means for conveying an article through the apparatus, b. laminating means for laminating one or more photosensitive layers to the article while the article is in motion, and c. a reciprocating exposure unit which moves synchronously with the laminated article and imagewise exposes the laminated article while the exposure unit and laminated article are in synchronous motion.

In a preferred embodiment of the invention, one side of each photosensitive layer is adhered to a flexible sheet support, and the apparatus has means for delaminating the support from the laminated article after exposure. In such an embodiment, the apparatus may also have means for heating the laminated article during delamination. It is further preferred that the exposure unit have register pins which engage register holes in the article during exposure.

The apparatus is useful for practicing the process of Assignee's patent to Celeste U.S. Pat. No. 3,469,982 where, on imagewise exposure to actinic radiation, photosensitive composition forms soluble and insoluble areas. On delamination of the sheet support, the photosensitive layers are left on the article and the soluble areas are then washed away to form a resist image. The apparatus is also useful for practicing the process of Assignee's patent application to Celeste et al., U.S. Pat. No. 3,607,264, where, on imagewise exposure to actinic radiation, a photosensitive composition forms hardened and unhardened areas and delamination of the support layer at a temperature above 45° C. causes the unhardened areas of the composition to fail cohesively leaving the unhardened material adhering to the article as a resist image and the hardened material adhering to the receptor sheet.

The invention is useful for forming resist images on a plurality of articles in a continuous manner, since the articles may be fed sequentially into the apparatus and be laminated and exposed while in motion. The synchronous exposure unit obviates the need for accumulator devices which can cause handling problems, and accurate registration for imagewise exposure of the articles is accomplished without exerting non-uniform stresses on the continuously moving article, which could result in damage to its surface.

DESCRIPTION OF THE DRAWINGS

An apparatus of the invention is described herein with reference to the drawings, wherein the same numbers are used throughout, in which.

DESCRIPTION OF THE PREFERRED EMBODIMENT

Figure 1:
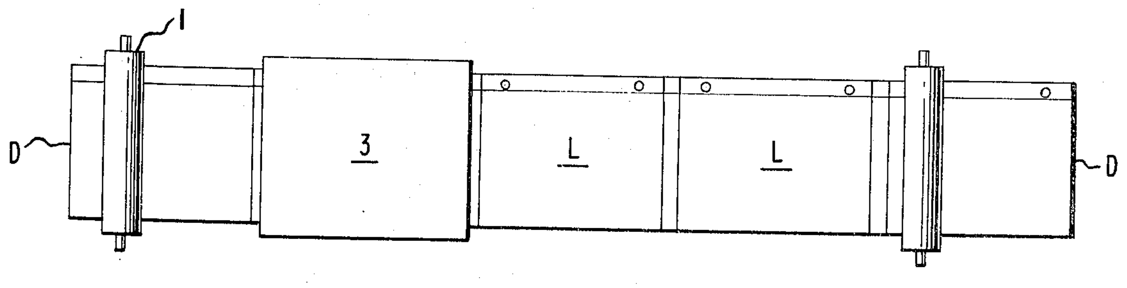
FIG. 1 is an overhead view of an embodiment of the invention.
Figure 2:
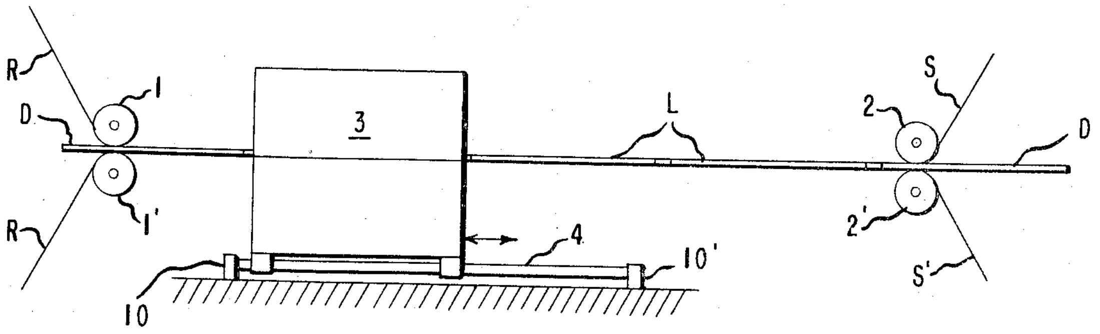
FIG. 2 is a side view of an embodiment of the invention.
Figures 3, 4:
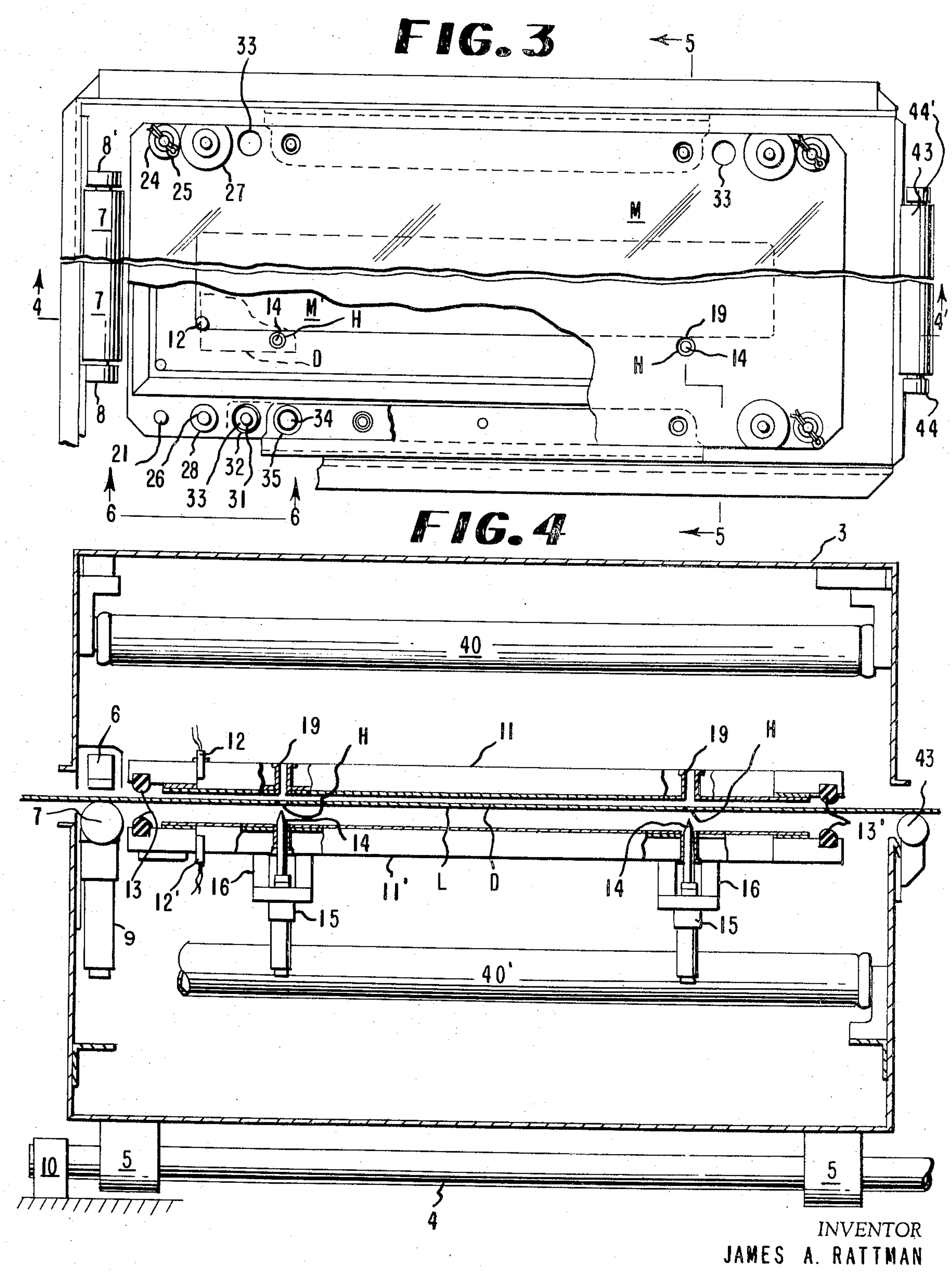
FIG. 3 is an overhead view of the exposure unit of an embodiment of the invention in partial section.
FIG. 4 is a view of an embodiment of the invention along section 4—4 of FIG. 3.

In the embodiment of the invention shown in the drawings, an article D, e.g., a flat copper-plated, glass fibre laminated board or sheet such as used for the manufacture of printed circuits, is fed to laminating rolls between upper and lower flexible supports S with a resist layer R on the support surface which comes in contact with the article. The support S with resist layer R is laminated to upper and lower surfaces of the article D by rolls to form a laminated article L, which is fed to an exposing unit. The exposing unit travels synchronously with the laminated article L and imagewise exposes it when it is in register with transparencies M and M′ by using register holes H. The exposing unit returns to its home position for repeating exposure to subsequent articles, and the exposed, laminated article L is fed to delaminating rolls where the flexible supports S are delaminated from the article according to the process of either of Assignee's patents cited above. The flexible support and photosensitive layer thereon are applied as a continuous sheet to at least one and preferably both sides of the article, as shown in FIG. 2 of the drawings. The support, which may be a polymeric film, not only protects the photosensitive layer, but supports the articles as they pass through the apparatus. The support must be delaminated from the articles subsequent to exposure. This can be done by hand or, as is preferred, by delaminating rolls, as also shown in FIG. 2. Together with the laminating rolls and other driven rolls, if any, the support(s) may constitute the means for conveying the article through the apparatus.

The preferred apparatus has laminating rolls 1 and 1′, and an exposure unit slidably mounted on rails 4 and 4′, and delaminating rolls 2 and 2′. The laminating and delaminating rolls may be heated rolls; additional rolls (not shown) are provided for supplying the resist-coated flexible support S and taking-up said support on delamination. Additional rolls (not shown) also are provided for peeling a protective cover sheet from the coated resist layer R as shown in U.S. Pat. No. 3,547,730, the disclosure of which is incorporated by reference herein. The apparatus of the invention is capable of continuous operation and thus enables efficient formation of high quality resist images.

Figures 5, 6:
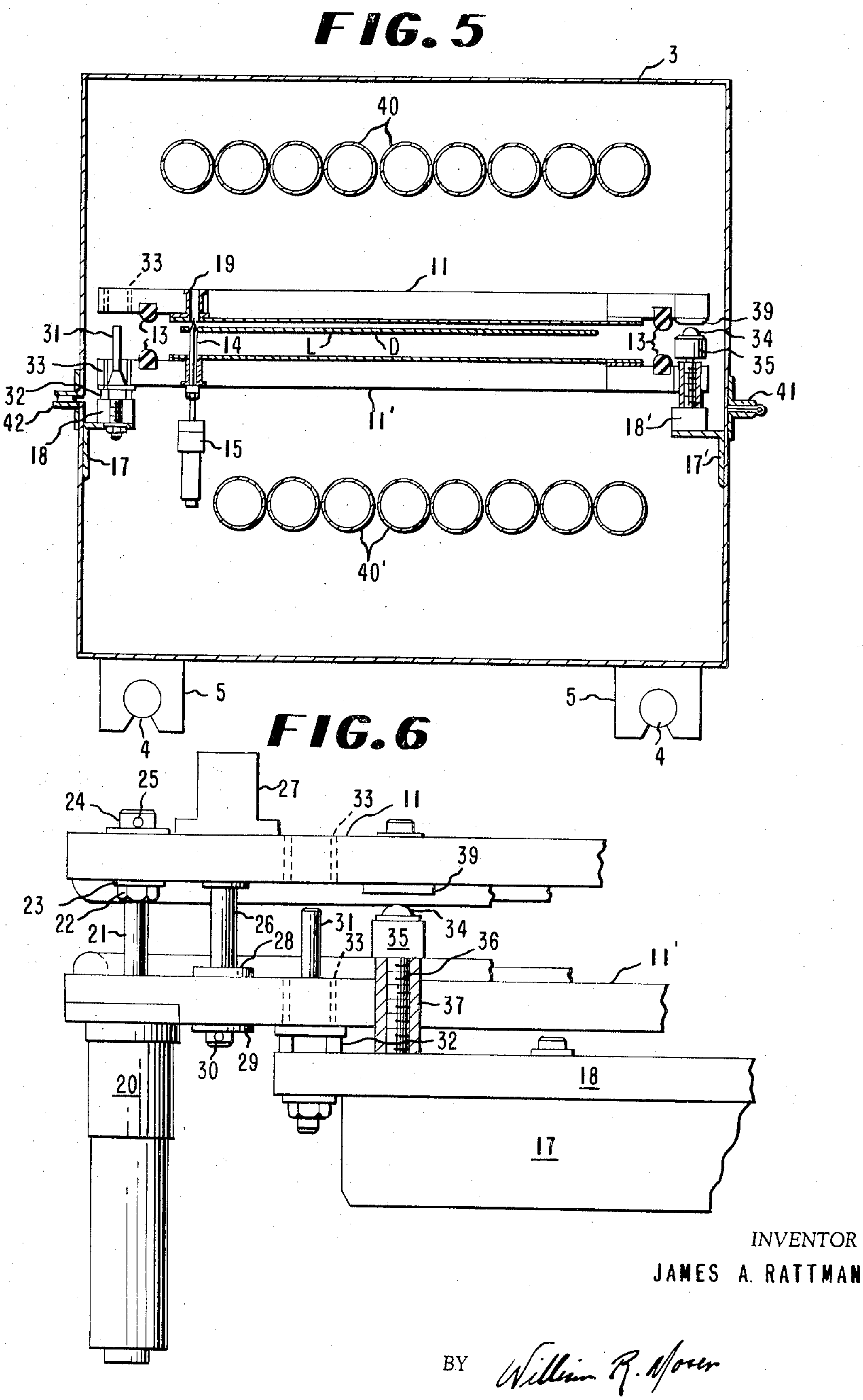
FIG. 5 is a view of an embodiment of the invention along section 5—5 of FIG. 3.
FIG. 6 is a detailed drawing of an embodiment of the invention along section 6—6 of FIG. 3.

The exposure unit 3 is slidably mounted on rails 4 and 4′ disposed in mounting blocks 10 and 10′ through suitable bearings (not shown) in slide bearing mountings 5. Entrance roll 7 is rotatably journaled in brackets 8 and 8′. Exit roll 43 is rotatably journaled in brackets 44 and 44′. Clamp bar 6 is mounted on piston shafts (not shown) of air piston 9 and another air piston (not shown) and mounted on the exposure unit above roll 7. Exposure frames 11 and 11′ are disposed on standoffs 18 and 18′ which are mounted on brackets 17 and 17′ in the exposure unit. Register pins 14 are mounted on piston shafts of air pistons 15 which in turn are mounted on lower frame 11′ by standoffs 16. A photocell 12 and its light source 12′ are mounted in frames 11 and 11′ respectively. Vacuum sealing strips 13 and 13′ of sponge rubber are mounted on opposing surfaces of the frames 11 and 11′. Upper and lower frames are operably connected by piston shafts 21. Alignment pins 26 are disposed at each corner of the frames. With particular attention to FIG. 6, the air piston 20 is rigidly affixed to lower frame 11′, upper frame 11 is properly spaced from the lower frame 11′ by nut 22 and washer 23, on the threaded piston shaft 21, and secured by retaining flange 24 and set screw 25. Alignment pin 26 is press fitted in flange bushing 28 which is in turn secured to the lower frame 11′ by retaining flange 29 and set screw 30. When no article is present for exposure the locating holes 33 at each corner of frame 11′ cooperate with the locating pins 31 which are tapered at their base to fix the position of the frames in the exposing unit and contact standoffs 32 at the base of pins 31. When an article is present for exposure the frames are drawn securely together by air pistons 20, roll plates 39 on upper frame 11 rest on captured balls 34. The balls 34 are disposed in sockets 35 and socket shafts 36 are thread mounted in standoffs 37 which are in turn press fitted in standoffs 18. When the frames are drawn together by action of the air pistons, upper frame 11 is pulled downward until roll plates 39 encounter the captured balls 34, at which time the lower frame 11′ is pulled upward until the piston shafts 21 travel their full stroke. The locating holes 33 in lower frame 11′ are raised above the tapered base of pin 31, and the captured balls allow the cooperating frames to move in the horizontal plane in any direction up to the difference in radii of the locating pin and locating hole. The register pins 14 in the lower frame are passed through the register holes H in the article into register holes 19 in the upper frame 11 and provide sufficient force to move the cooperating frames in any direction in the horizontal plane of the laminated article L. Precise registration is accomplished without damage to the laminated article L.

Transparencies M and M′ are suitably mounted in the exposure frames 11 and 11′ respectively and a vacuum is drawn by vacuum lines and pump (not shown) to provide proper contact of the transparencies with the laminated article for exposure by lamps 40 and 40′, which may be fluorescent lamps or other light sources suitable for exposure.

An air piston (not shown) is used to return the exposure unit to home position, and a shock absorber may be provided to cushion the exposure unit stop at the home position.

The apparatus may be equipped with a pre-heater to heat the resist coated web prior to lamination and delamination. The laminating rolls may be heated to provide proper lamination temperatures or heated laminating shoes may be used. The delaminating rolls may also be heated rolls. The laminating and delaminating rolls may be equipped with individual or synchronous variable speed motor controls, and may be journaled on brackets which are in turn mounted on air pistons for raising and lowering either the upper or lower roll to facilitate threading the flexible support and clearing jams. Reversing drive motors may be used for driving the laminating and delaminating rolls.

The exposure unit is provided with a hinge 41 and fastener 42 to facilitate access to the exposure frames for threading the flexible support, inserting transparencies in the exposure frame, clearing jams, routine adjustments, and maintenance of components.

Figure 7:
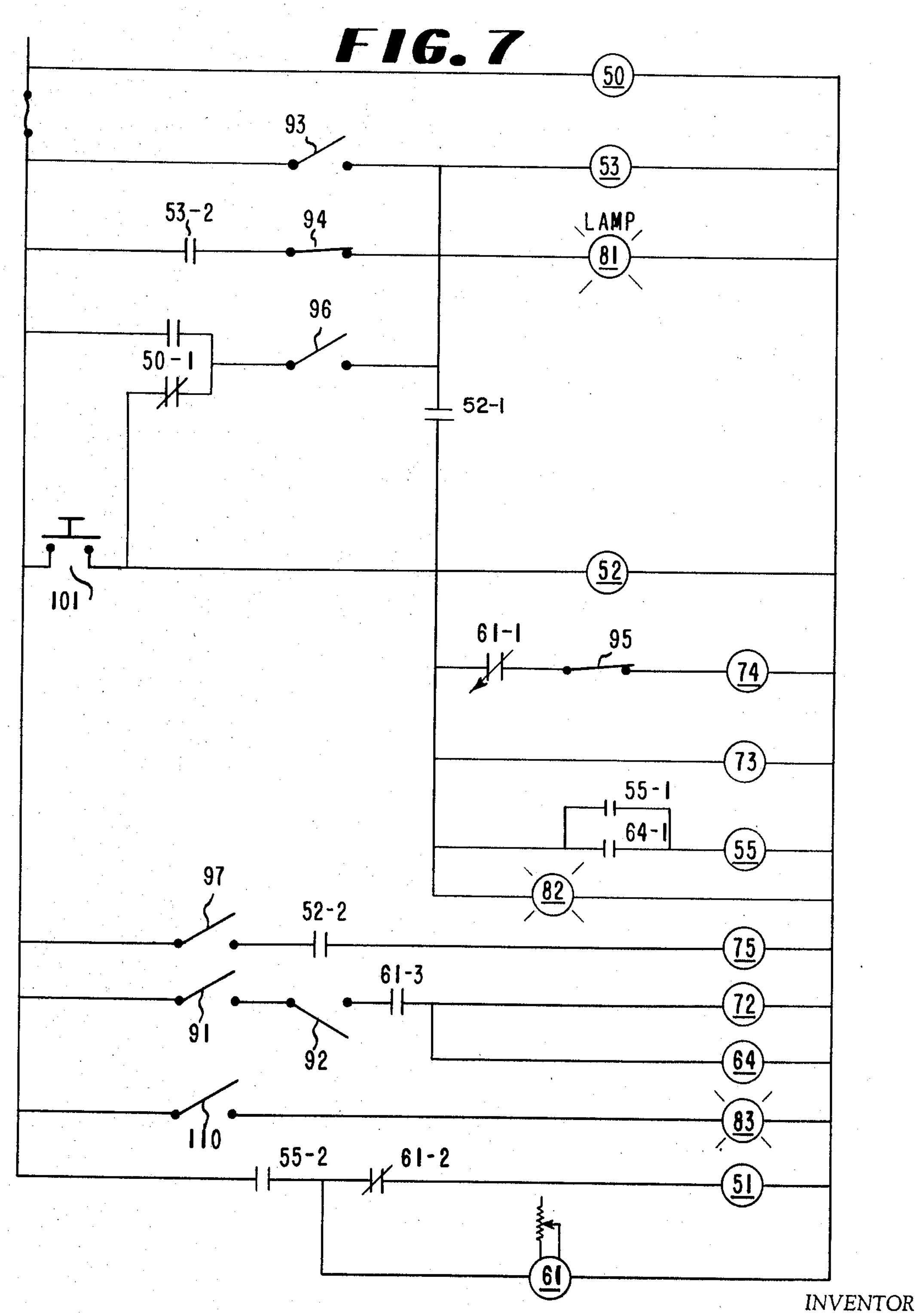
FIG. 7 is an electrical diagram of the control circuits of an embodiment of the invention.

The invention can be readily understood by a description of the operating sequence, with particular attention directed to the control diagram of FIG. 7.

An article D is fed into the laminating rolls with the resist coated flexible support S on either or both sides of the article and they are laminated. The laminated article L is then fed to the exposure unit. The leading edge of the article darkens photocell 12. Relay 50 is energized and form C contacts 50-1 are switched. Relay 53 and board sense lamp 81 are energized through limit switch 96 which is closed. The trailing edge of the article passes photocell 12, relay 50 is deenergized, and form C contacts 50-1 are switched, again. Relays 52 and 55 and solenoid 73 are energized through the normally closed contact of form C contact 50-1. Solenoid 73 activates air pistons 9 and 9′, and L is clamped by roll 7 and bar 6. Limit switch 96 on roll bracket 8 opens and isolates relay contacts 750-1. The exposure unit 3 securely clamped to the laminated article L moves synchronously, i.e., at the same speed, with it. Solenoid valve 74 is energized through relay contact 61-1 and limit switch 95, activating air pistons 15 and air pistons 20. Air pistons 15 insert register pins 14 into register holes H in the article. (See position of register pins in FIG. 5.) Air pistons 20 pull upper exposure frame 11 downward until roll plates 39 contact captured balls 34. The upper exposure frame 11 is constrained from further downward travel. The lower frame 11′ is pulled upward and the locating holes 33 are lifted above the tapered section of locating pins 31. Cooperating frames 11 and 11′ are enabled to move in any direction by roll plates 39 and balls 34 and are guided by register pins 14 as the pins pass through register holes H in the articles and into register holes 19 in upper frame 11. Limit switch 93 closes when the upper frame contacts the captured balls, and seals in relay 52 and solenoids 73 and 74 through relay contact 52-1. Limit switch 94 opens when the exposure unit leaves home position. Limit switches 91 and 92 close when the exposure frames are brought together and the vacuum seals are made, energizing vacuum solenoid 72 and time delay relay 64. Relay contact 64-1 energizes relay 55, which seals itself in through it's own contact 55-1. Relay contact 55-2 energizes time delay relay 61 and exposure control relay 51. Relay contacts 51-1 energize the exposure lamps 40 and 40′. Time delay relay contacts 61-1 and 61-2 and 61-3 are normally closed and open after the preset exposure time. Contact 61-2 drops out the exposure control relay 51, contact 61-3 drops out the vacuum solenoid 72, and contact 61-2 drops out solenoid 74 which deactivates the air pistons for the exposure frames and register pins. The upper frame releases limit switch 93, relays 52, 53, 55, solenoid 73, and indicator lamps 81 and 82 are all deenergized. Relay contact 55-2 resets time delay relay 61. Solenoid 73 deactivates air pistons 9 and 9' releasing the clamp roll 7. Relay contact 52-2 energizes solenoid 75 thru limit switch 97 activating the exposure unit return air piston. The exposure unit returns to home position and limit switch 97 opens deactivating the return air piston.

The apparatus may be operated manually for test by push button 101, and manual exposure switch 110.

The embodiments of the invention in which an exclusive property or privilege is claimed are defined as follows:

1. An apparatus useful for forming an image on the surface of a continuously moving stiff article comprising a. means for conveying an article through the apparatus, b. laminating means for laminating one or more photosensitive layers to the article while the article is in motion, and c. a reciprocating exposure unit which moves synchronously with the laminated article and imagewise exposes the laminated article through at least one transparency while the exposure unit and laminated article are in synchronous motion.

2. An apparatus according to claim 1, wherein said laminating means comprises a pair of rolls spaced so as to engage said article.

3. An apparatus according to claim 1, wherein said exposure unit has register pins that engage holes in said article during exposure.

4. An apparatus according to claim 1, wherein said photosensitive layers are adhered on one side to flexible supports, said supports comprising continuous web.

5. An apparatus according to claim 4 having means for delaminating said supports from the laminated article after exposure.

6. An apparatus useful for forming resist images on a plurality of stiff, flat boards comprising a. a pair of rolls for laminating continuous photosensitive sheets to both sides of the boards as the boards are fed sequentially between the rolls, said photosensitive sheets comprising flexible polymeric films with a layer of photosensitive material adhered to the films on the sides of the films adjacent to the boards, b. a reciprocating exposure unit that engages each moving laminated board and imagewise exposes the board through at least one transparency while the board and exposure unit are moving together at the same speed, the exposure unit having means by which it can be returned to its initial position for exposure to the next board in sequence, and c. a pair of delaminating rolls for removing said films from the exposed boards.

7. The apparatus of claim 6, said apparatus having means for heating the boards prior to lamination and delamination.

8. An apparatus according to claim 1, wherein said reciprocating exposure unit has registration means comprising:

a. means to detect the presence of said article in position for exposure, and b. means to securely clamp said article to the exposure unit.

9. An apparatus according to claim 8, wherein said means to securely clamp said article to the exposure unit comprises:

a. upper and lower exposure frames, at least one of which contains a transparency through which exposure is made, said exposure frames being supported by a supporting means which permits lateral movement of said exposure frames for registration with the laminated article, and b. registration pins capable of vertical movement for registration of said exposure frames with said laminated article.

* * * * *